US011665545B2

(12) United States Patent
Saloni et al.

(10) Patent No.: US 11,665,545 B2
(45) Date of Patent: May 30, 2023

(54) DETECTION AND MITIGATION OF BSS COLOR RELATED ATTACKS ON HIGH EFFICIENCY NETWORKS

(71) Applicant: HEWLETT PACKARD ENTERPRISE DEVELOPMENT LP, Houston, TX (US)

(72) Inventors: Shubham Saloni, Santa Clara, CA (US); Abhiruchi Dakshinkar, Santa Clara, CA (US); Wei Hu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 36 days.

(21) Appl. No.: 17/245,439

(22) Filed: Apr. 30, 2021

(65) Prior Publication Data
US 2022/0353689 A1 Nov. 3, 2022

(51) Int. Cl.
*H04W 12/122* (2021.01)
*H04W 12/088* (2021.01)
*H04L 29/06* (2006.01)
*H04L 9/40* (2022.01)

(52) U.S. Cl.
CPC ....... *H04W 12/122* (2021.01); *H04L 63/1458* (2013.01); *H04W 12/088* (2021.01); *H04L 2463/141* (2013.01)

(58) Field of Classification Search
CPC .............. H04W 12/122; H04W 12/088; H04L 63/1458; H04L 2463/141; H04L 29/06
See application file for complete search history.

(56) References Cited

U.S. PATENT DOCUMENTS

| | | | |
|---|---|---|---|
| 10,492,221 B1* | 11/2019 | Chu | E21B 21/08 |
| 2015/0046984 A1* | 2/2015 | Belton, Jr. | H04L 63/10 |
| | | | 726/4 |
| 2017/0359300 A1 | 12/2017 | Patil et al. | |
| 2018/0110046 A1* | 4/2018 | Patil | H04W 72/0446 |
| 2018/0220368 A1 | 8/2018 | Gidvani et al. | |
| 2019/0357256 A1 | 11/2019 | Kim et al. | |
| 2020/0037395 A1 | 1/2020 | Ko et al. | |
| 2020/0236134 A1 | 7/2020 | Bhanage et al. | |
| 2020/0244321 A1* | 7/2020 | Siraj | H04L 43/04 |
| 2021/0006361 A1* | 1/2021 | Asterjadhi | H04L 1/1825 |
| 2021/0385220 A1* | 12/2021 | Beaudin | H04W 12/08 |

OTHER PUBLICATIONS

WLAN, "11ax / Wi-Fi 6: BSS Color", Jan. 10, 2020, 69 Pages.

* cited by examiner

*Primary Examiner* — Quazi Farooqui
(74) *Attorney, Agent, or Firm* — Sheppard Mullin Richter & Hampton LLP

(57) ABSTRACT

An access point (AP) in a deployment may be attacked by a rogue AP. The rogue AP may transmit fake beacons that include a fake/incorrect basic service set (BSS) color that does not match the BSS color assigned to/used by the AP under attack. Due to this BSS color mismatch, stations associated to the AP under attack may switch to the fake/incorrect BSS color, and communications between the AP under attack and the stations may be disrupted, and can eventually lead to service denial. Systems and methods are provided for leveraging the BSS color feature to identify when a rogue AP is attacking another AP. Upon detecting an attack, the BSS color feature may be disabled to mitigate the level of service disruption to the AP under attack and the stations associated to that AP.

15 Claims, 7 Drawing Sheets

| Element ID 202 | Length 204 | Element ID Extension 206 | Color Switch Countdown 208 | New BSS Color Information 210 |
|---|---|---|---|---|
| 1 | 1 | 1 | 1 | 1 |

BSS COLOR CHANGE ANNOUNCEMENT ELEMENT 200

Octets:

FIG. 2A

DETECTION AND MITIGATION OF BSS COLOR RELATED ATTACKS ON HIGH EFFICIENCY NETWORKS

DESCRIPTION OF RELATED ART

The explosion and proliferation of wireless electronic devices has led to an increasing number of challenges in trying to accommodate the increasing number of users on wireless communication channels. For example, high levels of interference brought about by large numbers of users threatens to degrade the levels of network performance that users have come to expect. The IEEE 802.11 networks have continued to evolve in an attempt to address these challenges. These challenges have been addressed to some extent by introducing and Basic Service Sets (BSS) Color schemes in IEEE 802.11ax and IEEE 802.11ah implementations, respectively. These schemes are intended to improve network throughput and spectrum efficiency in dense environments.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A illustrates an example of a BSS color change announcement element.

Figure 1:
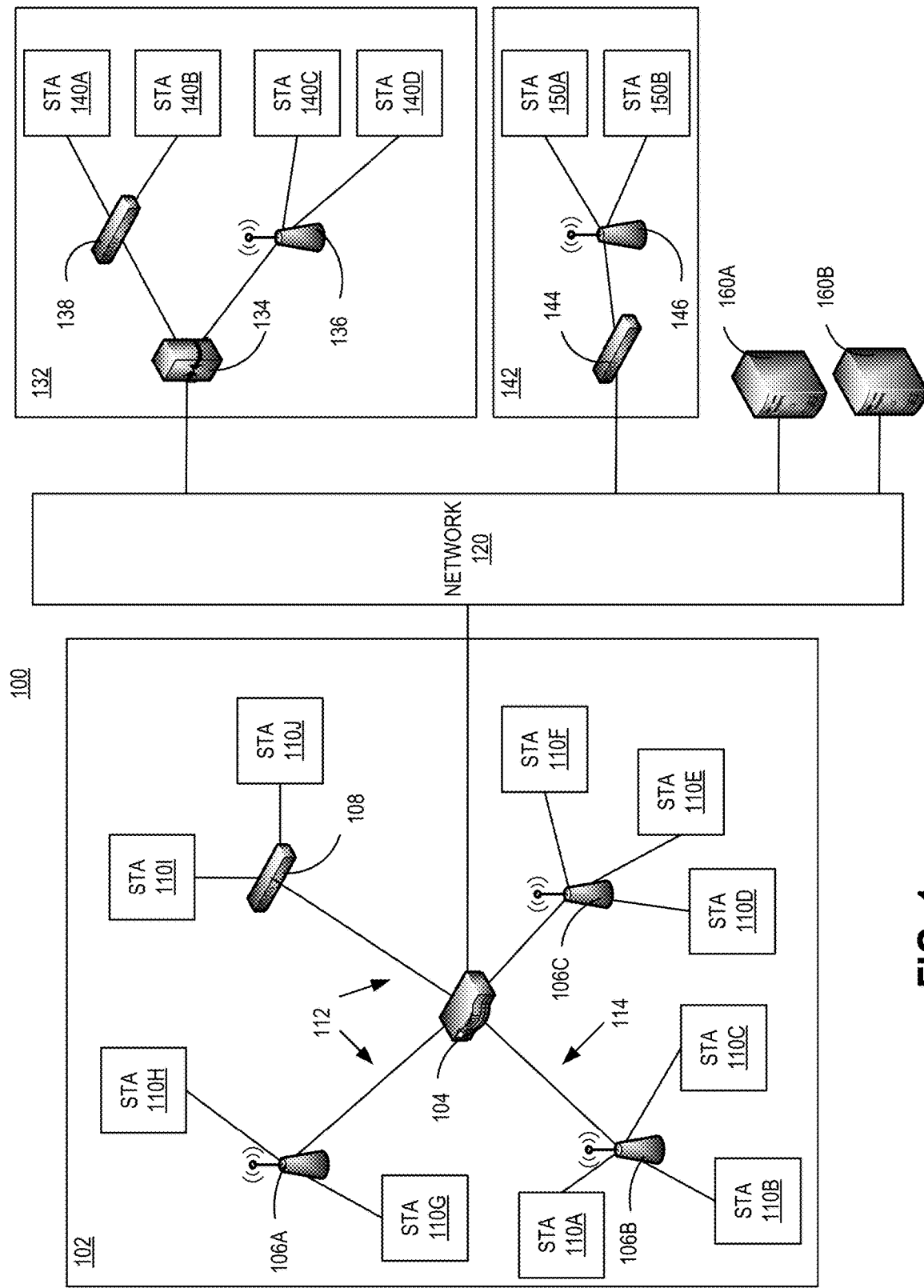
FIG. 1 illustrates one example of a wireless network deployment that may be implemented for an organization, such as a business, educational institution, governmental entity, healthcare facility or other organization.

The figures are not exhaustive and do not limit the present disclosure to the precise form disclosed.

DETAILED DESCRIPTION

As noted above, certain schemes are intended to improve network throughput and spectrum efficiency in dense environments. Particularly, BSS coloring was introduced in 802.11ah (and widely deployed as part of 802.11ax) to increase the network capacity in dense environments by improving the ability to reuse frequencies via a mechanism referred to as Spatial Reuse (SR). BSS color may be used to differentiate between intra-BSS frames and Overlapping BSS (OBSS) frames, and to determine which Clear Channel Assessment (CCA) threshold to use while accessing the shared channel resource in the same frequency range. This SR feature allows two or more devices existing in different, adjoining basic service sets (BSSs) in the same frequency channel to transmit simultaneously if certain conditions are met. These conditions are described by using different CCA levels for inter-BSS and intra-BSS frames on the same channel. The distinction between inter and intra-BSS frames is given by the color parameter embedded in a packet by the respective BSS. Depending on the CCA thresholds for inter-BSS vs intra-BSS frames, one access point (AP) or device may defer medium access to the other AP or device depending on the BSS where the packet originated.

BSS color is, in effect, an identifier of a BSS, and can be used to assist a receiving station (STA) in identifying the BSS from which a physical layer packet data unit (PPDU) was transmitted, and can be found in the preamble of a High Efficiency (HE) PPDU, i.e., in an HE-SIG-A field, which refers to a HE signal A. This HE-SIG-A field contains information about the packet to follow, including whether it is a downlink (DL) or uplink (UL) packet, as well as the BSS color/MCS rate/bandwidth/spatial stream information associated with the following packet. A radio can detect that its BSS color collides with the BSS color used by its neighboring radios from a BSS color collision report from its associated stations (STAs) or by receiving frames from an OBSS STA containing the same BSS color. If the collision persists too long (for example, the specified dot11BSSColorCollisionAPPeriod minimum value is 50 seconds), it stops using that BSS color or it switches to a different BSS color as specified by IEEE 802.11ax D2.2. When a radio observes a BSS color conflict over a certain duration it may switch to a different BSS color that does not conflict with BSS color used by its neighboring radios.

Embodiments of the present disclosure leverage BSS color to identify attacks that may be launched by rogue APs in a network deployment. One effect of such attacks is the forcing of STAs associated to a particular AP under attack to move to a different BSS color. The result is a mismatch in BSS color between the AP under attack and is associated APs. This mismatch can lead to dropped packets, disruptions in connection, and eventually, a denial of service for the STAs.

In particular, an attacker, e.g., rogue AP, may send fake beacons. Such fake beacons can announce an unauthorized/fake BSS color change or can signal a different BSS color than that associated with an AP under attack. In some embodiments, fake beacons can be identified by virtue of a Media Access Control (MAC) address mismatch, i.e., a mismatch between the (correct) MAC address associated with an AP and that received as part of a fake beacon. Upon detecting a mismatch between MAC addresses, BSS coloring can be disabled. In other embodiments, a buffer status report poll (BSRP) trigger frame can be transmitted to a STA, where previous transmissions to the STA from the AP have failed. If the BSS color perceived by the STA (determined from a response to the BSRP trigger frame) differs from that associated with the AP under attack, BSS coloring can again be disabled. Further still, a BSS color-to-MAC address mapping associated with APs in a deployment can be shared amongst all/some of the APs in that deployment. Accordingly, in the event an AP receives a beacon intended for an affiliated AP in the deployment, that AP can compare the BSS color and MAC address received in the beacon to the known BSS color-to-MAC address mapping on behalf of the affiliated AP to determine if there is a mismatch. In the event a mismatch exists, yet again, BSS coloring can be disabled for the affiliated AP.

Before describing embodiments of the disclosed systems and methods in detail, it is also useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple STAs 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or STAs connected to a network. The controller 104 may itself be, or provide the functionality of, an access point.

The controller 104 may be in communication with one or more switches 108 and/or wireless Access Points (APs) 106*a-c*. Switches 108 and wireless APs 106*a-c* provide network connectivity to various STAs 110*a-j*. Using a connection to a switch 108 or AP 106*a-c*, a STA 110*a-j* may access network resources, including other devices on the (primary site 102) network and the network 120.

Examples of STAs may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired STAs 110*i-j*. STAs 110*i-j* may connect to the switch 108 and through the switch 108, may be able to access other devices within the network configuration 100. The STAs 110*i-j* may also be able to access the network 120, through the switch 108. The STAs 110*i-j* may communicate with the switch 108 over a wired 112 connection. In the illustrated example, the switch 108 communicates with the controller 104 over a wired 112 connection, though this connection may also be wireless.

Wireless APs 106*a-c* are included as another example of a point of access to the network established in primary site 102 for STAs 110*a-h*. Each of APs 106*a-c* may be a combination of hardware, software, and/or firmware that is configured to provide wireless network connectivity to wireless STAs 110*a-h*. In the illustrated example, APs 106*a-c* can be managed and configured by the controller 104. APs 106*a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various STAs 140*a-d*.

In various embodiments, the remote site 132 may be in direct communication with primary site 102, such that STAs 140*a-d* at the remote site 132 access the network resources at the primary site 102 as if these clients devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various STAs 150*a-b* access the network 120. Such a remote site 142 may represent, for example, an individual employee's home or a temporary remote office. The remote site 142 may also be in communication with the primary site 102, such that the STAs 150*a-b* at remote site 142 access network resources at the primary site 102 as if these STAs 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The STAs 110a j, 140a-d, 150a-b may request and access the multimedia content provided by the content servers 160a-b.

Although 10 STAs 110a-j, or stations (STAs), are illustrated at primary site 102 in the example of FIG. 1, in various applications, a network may include a lesser or greater quantity of STA's. Indeed, some implementations may include a dramatically larger quantities of STAs. For example, various wireless networks may include hundreds, thousands, or even tens of thousands of STAs communicating with their respective APs, potentially at the same time. As noted above, various IEEE 802.11 networks may implement what is referred to as BSS coloring to increase network capacity in such dense environments. This can allow improvement and frequency reuse among network devices.

It should be understood that BSS "color" is an index number, e.g., from 1 to 63, assigned to individual APs along with channel assignment, whether manually, through self-automated determination, or via external automated determination and assignment. When APs share the same channel and are in the same vicinity, they should have different BSS colors. When two BSSs operating on the same channel have the same BSS color, a condition referred to as color collision occurs, and can be detected by a STA. The STA may then alert the AP to which it is associated, prompting the AP to announce a BSS color change (via beaconing).

As specified by the 802.11ax standard, an HE AP may change its BSS color under certain conditions/circumstances. For example, an AP may detect, e.g., a neighboring AP associated with an OBSS that is using the same BSS color. In response to such a determination, the AP can announce an upcoming BSS color change using a BSS color change announcement element. FIG. 2A illustrates the format/structure of such a BSS color change announcement element 200. As illustrated in FIG. 2A, a BSS color change announcement element 200 may comprise an element ID field 202, that along with an element ID extension field 206 (if an extension exists) identifies BSS color change announcement element 200. A length field 204 indicates the length, e.g., in bytes/octets of BSS color change announcement element 200. Color switch countdown field 208 may include a countdown timer indicating the number of target beacon transmission time (TBTT) periods of beacon intervals remaining until the time at which the AP will switch to a new BSS color (TBTTcs). A color switch countdown value of 0 indicates that the switch to a new BSS occurs at the current TBTT if this element is carried in a beacon frame or at the next TBTT following the frame that carried the element if the frame is not a beacon frame. New BSS color information field 210 may indicate the new BSS color to be used that the given time (TBTTcs). A non-AP HE STA that receives a BSS color change announcement element from an AP uses the value specified in the new BSS color information field 210 (also carried by the HE operation element discussed below) as the BSS color when communicating with that AP following a BSS color change TBTT.

Figure 2B:
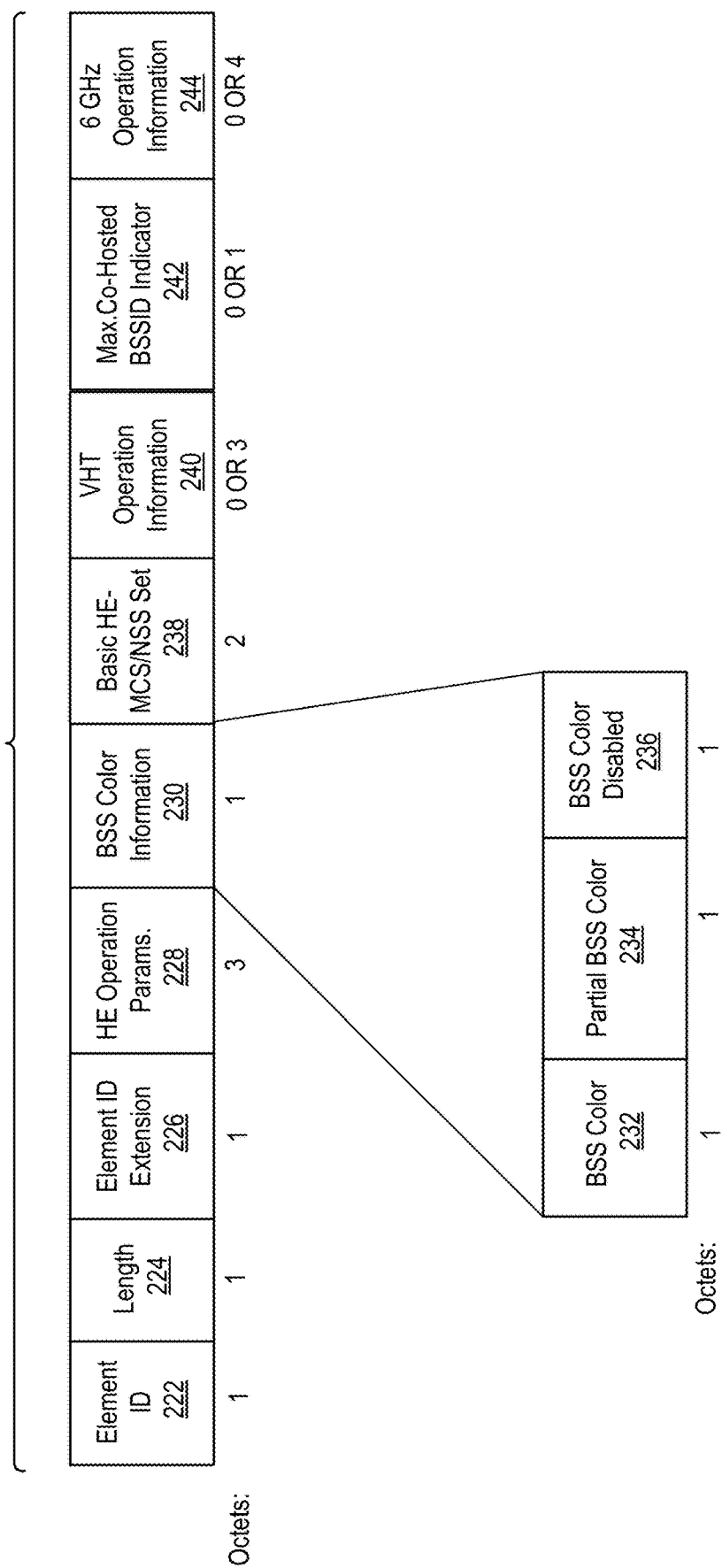
FIG. 2B illustrates an example High Efficiency (HE) operation element.

FIG. 2B illustrates an HE Operation element 220. HE operation element 220 may be included/found in beacon frames, association/reassociation frames, and probe response frames. HE APs may use the HE operation element 220 to determine BSS color information of neighboring APs. Similar to BSS color change announcement element 200, HE Operation element 200 may comprise an element ID field 222, that along with an element ID extension field 226 (if an extension exists) identifies BSS color change announcement element 200. A length field 204 indicates the length, e.g., in bytes/octets of HE Operation element 220. HE Operation Parameters field 228 contains information regarding HE operating parameters, such as, e.g. a transmit opportunity (TXOP) duration request to send (RTS) threshold. Basic HE-MCS/NSS Set field 238 indicates the MCS rate and number of spatial streams, while Very High Throughput (VHT) operation information field 240 is an information element used in management frames to set up the operation of a network/deployment (e.g., specifying channel width, first channel center frequency segment 0, and so on). Maximum co-hosted BSSID indicator field 242 refers to the maximum number of BSSIDs in a co-hosted BSSID, in other words, the maximum number of virtual APs (VAPs) on a radio. 6 GHz operation information field 244 may provide channel and bandwidth information related to 6 GHz operation of an AP.

BSS color information field 230 may comprise BSS color field 232 which specifies the BSS color value for that AP, partial BSS color field 234, which indicates (when not 0) an AID assignment. The BSS color information field 230 further comprises a BSS color disabled field 236, which can be an indication that BSS coloring is disabled for the AP sending HE operation element 220.

As described above, the 802.11 standard specifies the ability for an AP to change its BSS color. However, the 802.11 standard does not contemplate a response to the broadcasting of fake BSS color change announcements. Moreover, the 802.11 standard does not specify the manner in which a STA should behave upon receiving a beacon with new BSS color information in an HE operation element without receiving a corresponding BSS color change announcement element indicating that the BSS color is to change. The value of the BSS color change countdown (specified in the color change countdown field 208 of BSS color change announcement element 200 of FIG. 2A) may depend on AP implementation. It is possible that a STA may miss these BSS color change announcements altogether, e.g., due to the STA being in a power save mode, or due to operating under bad channel conditions.

Thus, attacks can occur in a variety of ways. In one scenario, an attacker, e.g., rogue AP, may send fake beacons with a BSS color change announcement element with a color switch countdown field comprising a value of 0. Additionally, a different BSS color will be specified in the new BSS color information field 210 of BSS color change announcement element 200, as well as in BSS color field 232 of HE operation element 220. Alternatively, an attacker may send a fake beacon with a different BSS color (than that actually assigned to an AP) in the BSS color information field 232 of HE operation element 220 (without sending a corresponding BSS color change announcement).

After receiving at least one of the aforementioned fake beacons, a STA, not being aware that the received beacon is fake, will update its BSS color to whatever was specified in the fake beacon. Because the STA changes its BSS color from that assigned to the AP under attack (to which it is associated) to another BSS color (specified in the fake beacon), any data frames sent by the AP (that is being attacked) may be ignored by the STA. This is because the data frames from the "real" AP will be associated with a BSS color that the STA is no longer associated with, post-BSS color change. That is, there will be a BSS color mismatch between the AP to which the STA is associated and the STA.

Because the STA ignores data packets/frames sent by the AP, the AP will attempt to retransmit those data packets/frames (e.g., for which the AP did not receive a acknowledgement (ACK)). Excessive retries and data loss can result in poor Quality of Experience (QoE) for the STA. Additionally, due to the increased airtime usage by the AP under attack, the OBSS, as well as legacy clients connected to the AP under attack (which don't process the BSS color) also experience a degradation in QoE. The AP under attack, in response to the excessive retries and packet dropping may also eventually drop the STA (denial of service) leading to connection disruption for the STA. Conversely, the AP may discard packets/frames it received from affected STAs (those that switched to a new BSS color based on the fake beacon (s) sent by the attacking AP) based on a BSS color check procedure. This can result in a STA-initiated disconnection from the AP.

It should be noted that the impact of an attack on an AP in the above-described manner may depend on the frequency of the fake beacon transmissions, and its time offset with respect to any actual/real beacon sent by the AP under attack. For example, an attacker AP may time a fake beacon to match the TBTT of the AP under attack, and transmit a fake beacon just after the real beacon transmission to maximize the impact over the beacon interval.

For example, a real-world example of an attack has been observed, where (upon analyzing a sniffer capture) a beacon packet having a different BSS color in an HE operational element causes a STA associated to an AP to move to a new BSS color immediately (color switch countdown field comprising a value of 0). Thus, the STA ignores/does not ACK data packets received from the AP subsequent to switching to the new BSS color, where the data packets received from the AP indicate a different BSS color (the previous or old BSS color that was actually assigned to the AP) as compared to the new BSS color to which the STA switched.

Various embodiments are directed to an AP, upon detecting a BSS color (or MAC address) mismatch, disabling BSS coloring.

Figure 3A:
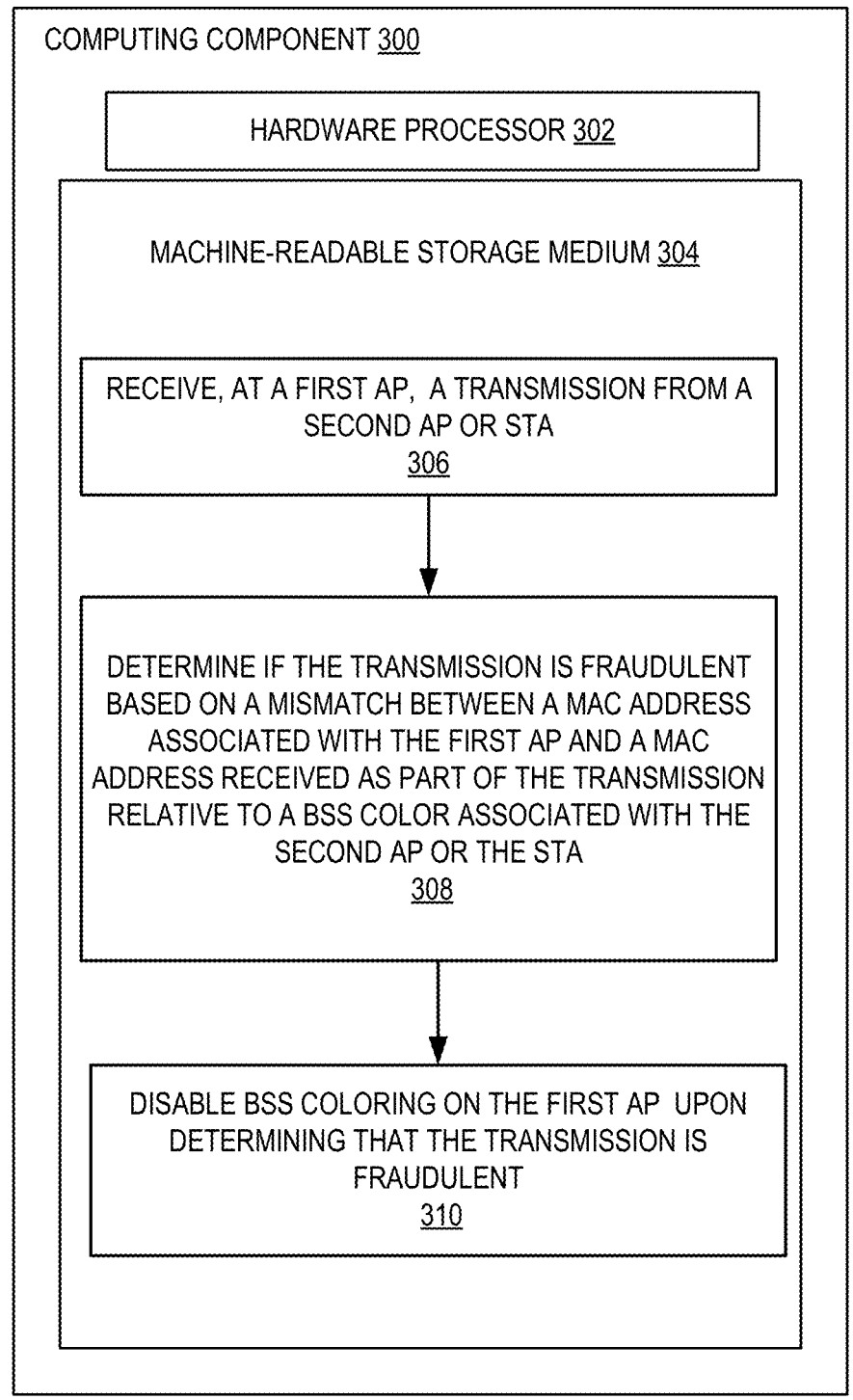
FIG. 3A is a block diagram of an example computing component or device for detecting and addressing a BSS color-based attack in accordance with one embodiment.

FIG. 3A is an example computing component 300 that may be used to implement various features of an elected merge leader in accordance with one embodiment of the disclosed technology. Computing component 300 may be, for example, a server computer, a controller, or any other similar computing component capable of processing data. In the example implementation of FIG. 3A, the computing component 300 includes a hardware processor 302, and machine-readable storage medium 304. In some embodiments, computing component 300 may be an embodiment of processor of an AP under attack/affiliated AP/other controller.

Hardware processor 302 may be one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions 306-310, 320-324, 330-334 to control processes or operations for detecting and addressing a BSS color attack. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-310, 320-324, 330-334.

Hardware processor 302 may execute instruction 306 to receive, at a first AP, a transmission from a second AP or STA. As alluded to above, that second AP can be a rogue AP or an AP attempting to attack a given AP. APs may advertise wireless local area networks (WLANs) to STAs by sending out beacons and probe responses that contain a WLAN's SSID, as well as, e.g., supported authentication and data rates. When a STA associates to an AP, that STA sends traffic to the AP's BSSID, which typically is the AP's Media Access Control (MAC) address. In some instances, a rogue APs beacons can be missed by the AP under attack or the rogue AP is "hidden" from the AP under attack, but is "seen" by a STA of the AP under attack. That is, pursuant to receipt of a fake beacon with a fake BSS color change announcement element or fake BSS color information in an HE operation element, the STA will commence sending data packets in the UL direction (to the AP under attack). However, because of the fake BSS color, the AP under attack will ignore the data packets from the STA, and the AP under attack is unaware of this BSS color mismatch prompted by the second (attacking) AP. That is, with BSS color checks in place for filtering received data packets, the AP under attack remains oblivious to the attack, but nevertheless, service is compromised for the STA.

Hardware processor 302 may execute instruction 308 to determine whether the transmission is fraudulent based on a mismatch between a MAC address associated with the first (potentially under attack) AP and a MAC address associated with the second (potentially attacking) AP or STA relative to a BSS color associated with the second AP or STA. That is, the AP that is potentially under attack knows its own MAC address and its own assigned BSS color. If the received transmission (whether a fake beacon or data packet transmission from a compromised STA) contains the AP's same MAC address but a BSS color different from its assigned BSS color, the AP can deem the beacon to be a fake beacon/transmission, as its BSS color-to-MAC address mapping is incorrect. In other words, the first AP enables packet filtering based on both BSS color and MAC address. When responding to a data packet transmission from a STA, the BSS color check can be more beneficial when it is active at the STA as it helps with increased power savings for the STA. The AP is, unlike STAs, not power constrained, and the impact of MAC address-based filtering is minimal. Since the AP is aware of associated STA MAC addresses and the active BSS color, it can detect when a STA/peer sends a packet with the incorrect BSS color and can then consider itself under attack.

Hardware processor 302 may execute instruction 310 to disable BSS coloring on the first AP upon determining that the transmission is fraudulent. By disabling BSS color, the STA(s) associated to the AP under attack would be forced to parse the MAC header of the incoming frame. It should be understood that any Wi-Fi device can identify the packet addressed to it by (1) filtering based on BSS color and (2) matching its MAC address. If BSS color is disabled, only MAC address matching will be performed (skipping BSS color filtering). Thus, a STA will ACK an incoming frame based on matching MAC address alone. If BSS color were not disabled, the STAs associated to the AP under attack would be under the impression that the AP under attack had switched to a new BSS color, and the STA would, e.g., ignore data packets sent by the AP under attack with the true BSS color.

Figure 3B:
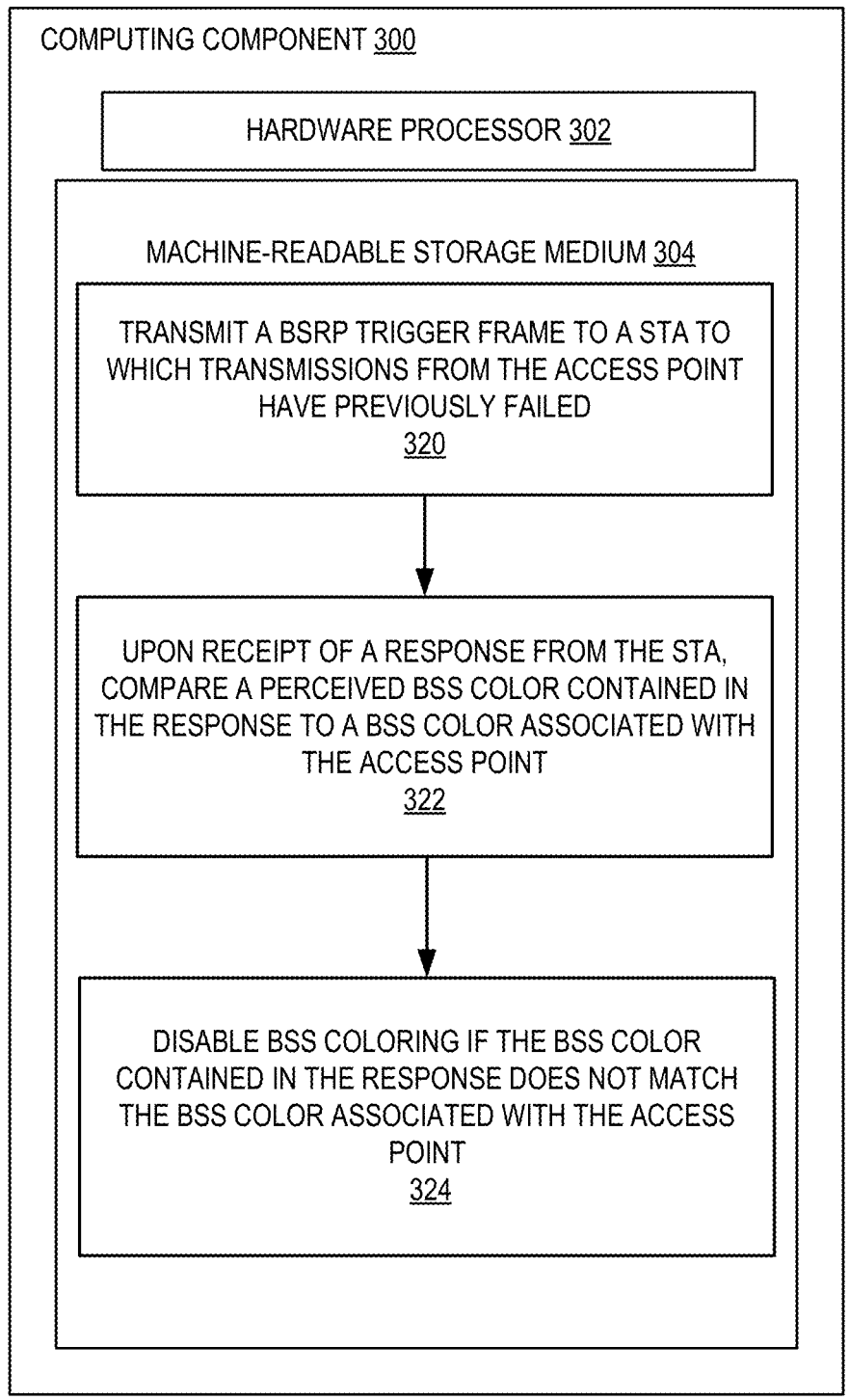
FIG. 3B is a block diagram of an example computing component or device for detecting and addressing a BSS color-based attack in accordance with one embodiment.

In the DL direction, data packets transmitted by the AP under attack will be ignored by the STA, again due to a BSS color mismatch. As illustrated in FIG. 3B, to address the above-described scenario, hardware processor 302 may execute instruction 320 to transmit a BSRP trigger frame to a STA to which transmission from the (under attack) AP have previously failed. That is, when the first AP is under attack, it will sense transmission failures to one or more STAs. It should be understood that failed transmissions to STAs can be the result of non-attack-related reasons, e.g., a STA running out of battery power, bad channel conditions, etc. However, to detect an actual attack, the AP under attack can send a BSRP trigger frame to those STAs associated with failed transmissions.

It should be noted that the 802.11ax specification introduces AP-initiated, trigger-based UL MU transmissions. In order to schedule UL transmissions, an AP may need information about the data buffered at a STA that is waiting to be transmitted. For example, an AP may transmit BSRP trigger frames to procure this information by allocating resources units (RUs) for the UL response. The STAs that are solicited by the AP will respond to the BSRP trigger frames with QoS NULL frames carrying the BSR in the suggested Resource Units (RUs). The STAs may also send unsolicited BSRs in QOS NULL or QOS Data frames. These QoS Null frames may be part of SU or MU transmissions. Accordingly, if the STA is associated to an AP under attack, in this example, the first AP, the STA will respond with a QOS NULL frame carrying its "current" perception of BSS color in the preamble. Accordingly, hardware processor may execute instruction 322 to, upon receipt of a response from the STA, compare a perceived BSS color contained in the response to a BSS color associated with the AP.

If the AP detects a mismatch in BSS color, the AP can consider itself under attack. That is, hardware processor 302 may execute instruction 324 to disable BSS coloring if the BSS color contained in the response does not match the BSS color associated with the AP. As discussed above, by disabling BSS color, the STA(s) associated to the AP under attack would be forced to parse the MAC header of the incoming frame to see if the MAC address matches. If BSS color were not disabled, the STAs associated to the AP under attack would be under the impression that the AP under attack had switched to a new BSS color, and the STA would, e.g., ignore data packets sent by the AP under attack with the true BSS color.

Figure 3C:
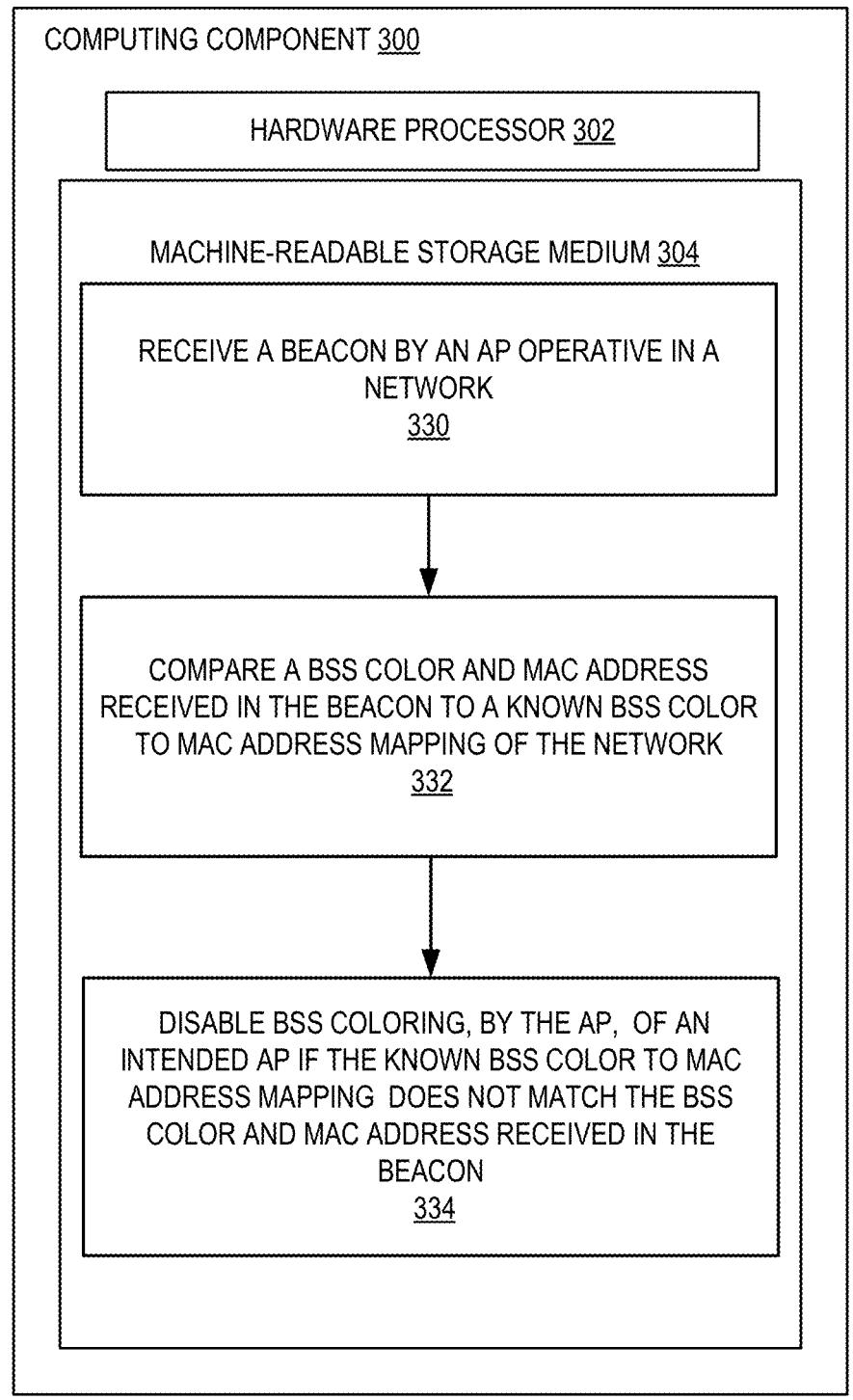
FIG. 3C is a block diagram of an example computing component or device for detecting and addressing a BSS color-based attack in accordance with one embodiment.

In yet another scenario, a fake beacon intended to attack one AP in an enterprise AP deployment may be received by another AP of the enterprise deployment. Thus, as illustrated in FIG. 3C, hardware processor 302 may execute instruction 330 to receive a beacon by an AP operative in a network. Depending on the power of a signal/transmission, APs (typically neighboring APs) may hear (e.g., can detect) communications or transmissions, such as beacons intended for STAs associated with neighboring APs. For example, in response to receipt of a fake beacon, a STA (in this scenario or a previously described scenario) may update its BSS color to a new (fake) BSS color advertised in the fake beacon. Subsequently, all data packets (transmitted from an AP in the network being attacked) with the true BSS color are not ACK'ed by the STA. It should be understood that the MAC address of a fake beacon can indicate the AP under attack. The AP under attack may try to retransmit these packets, but again, the STA will not ACK the packets. When the AP requests a block ACK by issuing a block acknowledgment request (BAR), a block ACK (BA) from the STA is sent with a BA bitmap of all zeros, indicating that the STA dropped all the packets transmitted by the AP under attack. It should be noted that the AP need not necessarily discard these packets (they can be cached/buffered for some amount of time), and upon disabling of BSS color (via instruction 334 described below), can be retransmitted to the STA. It should also be noted that packets transmitted by the STA to the AP (despite having the incorrect BSS color), also need not be discarded, and the AP may still ACK such received packets, and thus the STA need not necessarily retransmit its packets to the AP saving time/resources.

Hardware processor 302 may further execute instruction 332 to compare a BSS color and MAC address received in the beacon to a known BSS color-to-MAC address mapping of the network. That is, rogue AP detection may be used to detect potential attacks to APs other than itself. This can be accomplished by creating and maintaining a BSS color-to-AP MAC address mapping. This mapping can be maintained at some centralized database/repository or other network element, the cloud, etc. such that an AP has access or can obtain the mapping for use. In some enterprise deployments, mechanisms are implemented which allow APs to converse, e.g., for sending configuration information. Such mechanisms may also be leveraged to maintain or provide access to such a mapping. In this way, an AP can detect a potential attack on another AP. That is, upon receipt of a beacon, the affiliated AP can access the BSS color-to-AP MAC address mapping to see if any MAC addresses of APs in the network are associated with an incorrect BSS color.

It should be noted that in some cases, rather than hardware processor 302 (of an affiliated AP) performing this comparison, the AP under attack may receive the beacon. In this case, the AP under attack may also reference the BSS color-to-AP MAC address mapping to determine if the BSS color associated with its MAC address is the correct BSS color. For example, and in accordance with some embodiments, upon receipt of a beacon at an AP, a check can be performed to determine if the MAC address received in the beacon matches that of the receiving AP. If so, the AP can check to determine if the received BSS color matches its own BSS color (in accordance with instruction 308, FIG. 3A, for example). In the event the MAC address is different, the AP can check the global BSS color-to-AP MAC address mapping to see if another AP in the network, e.g., enterprise network, may be under attack.

Hardware processor 302 may execute instruction 334 to disable BSS coloring at intended AP if the known BSS color-to-AP MAC address mapping does not match the BSS color and MAC address received in the beacon at the affiliated AP, i.e., the beacon can be deemed to be a fake beacon. That is, hardware processor 302 may execute instruction 324 to disable BSS coloring if the BSS color contained in the response does not match the BSS color associated with the AP by, e.g., communicating with the AP under attack or with an AP controller that in turn, can inform the AP under attack that it is, indeed, under attack. The AP under attack may then disable BSS coloring. Again, by disabling BSS color, the STA(s) associated to the AP under attack would be forced to parse the MAC header of the incoming frame. If BSS color were not disabled, the STAs associated to the AP under attack would be under the impression that the AP under attack had switched to a new BSS color, and the STA would, e.g., ignore data packets sent by the AP under attack with the true BSS color.

Figure 4:
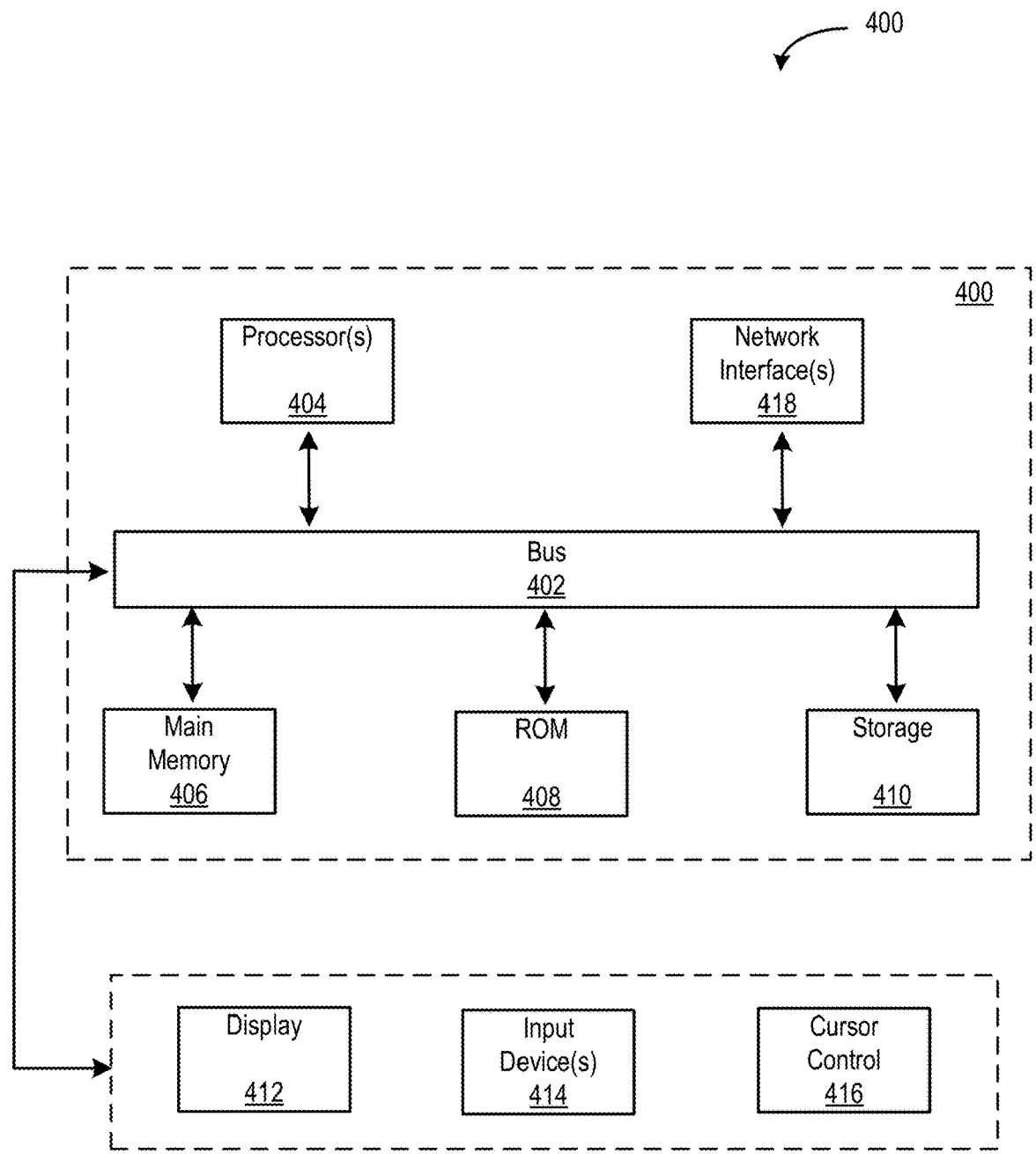
FIG. 4 is an example computing component that may be used to implement various features of embodiments described in the present disclosure.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component, the machine-readable storage medium comprising instructions to cause the hardware processor to:
   receive, at a first access point (AP), a transmission from a second AP or station (STA);
   determine whether the transmission is fraudulent based on a mismatch between a Media Access Control (MAC) address associated with the first AP and a MAC address received as part of the transmission relative to a basic service set (BSS) color associated with the second AP or the STA, wherein the transmission comprises a beacon transmitted by the second AP, and wherein the determination regarding whether the transmission is fraudulent is made pursuant to non-receipt of a BSS color change announcement at the first AP from the second AP corresponding to the beacon;
   disable BSS color feature at the first AP upon determining that the transmission is fraudulent.

2. The non-transitory machine-readable storage medium of claim 1, wherein the transmission comprises an uplink packet transmission by the STA to the first AP.

3. The non-transitory machine-readable storage medium of claim 2, wherein the instructions further cause the hardware processor to cache the uplink packet transmission prior to the disabling of the BSS color feature.

4. The non-transitory machine-readable storage medium of claim 3, wherein the instructions further cause the hardware processor to acknowledge (ACK) the uplink packet transmission prior to the disabling of the BSS color feature.

5. The non-transitory machine-readable storage medium of claim 1, wherein the instructions further cause the hardware processor to process subsequently received transmission based only on MAC address filtering.

6. A non-transitory machine-readable storage medium encoded with instructions executable by a hardware processor of a computing component, the machine-readable storage medium comprising instructions to cause the hardware processor to:
- transmit a trigger frame; from an access point (AP) to a station (STA) associated to the AP, subsequent to a threshold number of downlink packet transmissions from the AP to the STA for which no ACKs have been received;
- upon receipt of a response from the STA, compare a STA-perceived basic service set (BSS) color contained in the response to a BSS color associated with the AP; and
- disable BSS color feature at the AP if the BSS color contained in the response does not match the BSS color associated with the AP.

7. The non-transitory machine-readable storage medium of claim 6, wherein the instructions further cause the hardware processor to request a block acknowledgement (ACK) from the STA pursuant to non-receipt of any ACKs for the downlink packet transmissions.

8. The non-transitory machine-readable storage medium of claim 7, wherein the downlink packet transmissions are the result of the STA-perceived BSS color not matching the BSS color associated with the AP.

9. The non-transitory machine-readable storage medium of claim 6, wherein the STA-perceived BSS color results from a fake beacon transmitted by a rogue AP to the STA.

10. The non-transitory machine-readable storage medium of claim 7, wherein the instructions further cause the hardware processor to cache the downlink packet transmissions.

11. The non-transitory machine-readable storage medium of claim 9, wherein the instructions further cause the hardware processor to transmit the downlink packet transmissions to the STA after the disabling of the BSS color feature.

12. The non-transitory machine-readable storage medium of claim 6, wherein the AP receives the STA-perceived BSS color in a Quality Of Service (QOS) NULL frame.

13. A non-transitory machine-readable storage medium encoded with instructions executable by a hardware processor of a computing component, the machine-readable storage medium comprising instructions to cause the hardware processor to:
- receive a beacon by an access point (AP) operative in a network;
- compare a basic service set (BSS) color and Media Access Control (MAC) address received in the beacon to a known BSS color-to-MAC address mapping of the network; and
- disable BSS coloring, by the AP, of an intended AP if the known BSS color-to-MAC address mapping does not match the BSS color and MAC address received in the beacon, wherein the beacon received by the AP operative in the network is received from a rogue AP attacking the intended AP whose MAC address matches that of the MAC address received in the beacon.

14. The non-transitory machine-readable storage medium of claim 13, wherein the known BSS color-to-MAC address mapping is maintained in a centralized repository of the network operatively connected to the AP that received the beacon and the intended AP whose MAC address matches that of the MAC address received in the beacon.

15. The non-transitory machine-readable storage medium of claim 13, wherein the known BSS color-to-MAC address mapping is shared between APs operative in the network via an AP controller.

* * * * *